(12) United States Patent
Chen et al.

(10) Patent No.: US 8,864,988 B2
(45) Date of Patent: Oct. 21, 2014

(54) SUPERFICIALLY POROUS PARTICLES AND METHODS OF MAKING AND USING SAME

(75) Inventors: Wu Chen, Newark, DE (US); Ta-Chen Wei, Newark, DE (US)

(73) Assignee: Agilent Technologies, Inc., Santa Clara, CA (US)

( * ) Notice: Subject to any disclaimer, the term of this patent is extended or adjusted under 35 U.S.C. 154(b) by 1042 days.

(21) Appl. No.: 12/905,490

(22) Filed: Oct. 15, 2010

(65) Prior Publication Data

US 2011/0031179 A1 Feb. 10, 2011

Related U.S. Application Data

(62) Division of application No. 12/372,240, filed on Feb. 17, 2009, now Pat. No. 7,846,337.

(51) Int. Cl.
*B01J 20/28* (2006.01)
*B01J 20/32* (2006.01)
*B01J 20/286* (2006.01)

(52) U.S. Cl.
CPC .......... *B01J 20/3257* (2013.01); *B01J 20/3268* (2013.01); *B01J 20/3293* (2013.01); *B01J 20/286* (2013.01); *B01J 20/28004* (2013.01); *B01J 20/2803* (2013.01); *B01J 20/28078* (2013.01); *B01J 20/28057* (2013.01); *B01J 20/3242* (2013.01); *B01J 20/28016* (2013.01); *B01J 20/3295* (2013.01); *B01J 20/3272* (2013.01)
USPC ..................... 210/198.2; 210/502.1; 210/656; 502/405; 502/439

(58) Field of Classification Search
CPC ..................... B01J 20/28004; B01J 20/28016; B01J 20/2803; B01J 20/28057; B01J 20/28078; B01J 20/3295; B01J 20/3242; B01J 20/3257; B01J 20/3268; B01J 20/3272; B01J 20/3293; B01J 20/286
USPC ................... 210/635, 656, 659, 198.2, 502.1; 502/405, 439
See application file for complete search history.

(56) References Cited

U.S. PATENT DOCUMENTS

| | | |
|---|---|---|
| 3,505,785 A | 4/1970 | Kirkland |
| 4,010,242 A | 3/1977 | Iler et al. |
| 4,105,426 A | 8/1978 | Iler et al. |
| 4,460,722 A | 7/1984 | Igarashi et al. |
| 4,477,492 A | 10/1984 | Bergna et al. |
| 4,560,704 A | 12/1985 | Regnier et al. |
| 4,874,518 A | 10/1989 | Kirkland et al. |
| 4,986,908 A | 1/1991 | Stout et al. |
| 5,032,266 A | 7/1991 | Kirkland et al. |
| 5,540,834 A | 7/1996 | Carr et al. |

(Continued)

FOREIGN PATENT DOCUMENTS

| | | |
|---|---|---|
| EP | 2008971 A1 | 12/2008 |
| WO | WO-2007/095158 A2 | 8/2007 |
| WO | WO-2007/095162 A2 | 8/2007 |

OTHER PUBLICATIONS

Restriction Requirement in U.S. Appl. No. 12/372,240.

(Continued)

*Primary Examiner* — Ernest G Therkorn
(74) *Attorney, Agent, or Firm* — Milstein Zhang & Wu LLC

(57) ABSTRACT

Disclosed are porous-shell particles, methods of making the particles, and uses thereof. In one aspect, the porous-shell particles are superficially porous particles.

7 Claims, 3 Drawing Sheets

(56) References Cited

U.S. PATENT DOCUMENTS

| | | |
|---|---|---|
| 7,230,123 B2 | 6/2007 | Barre et al. |
| 2007/0189944 A1 | 8/2007 | Kirkland et al. |
| 2008/0245476 A1 | 10/2008 | Loth et al. |
| 2008/0277346 A1 | 11/2008 | Kirkland et al. |
| 2009/0297853 A1 | 12/2009 | Kirkland et al. |
| 2009/0311533 A1 | 12/2009 | Chen et al. |
| 2010/0051877 A1 | 3/2010 | Wei et al. |
| 2010/0206797 A1 | 8/2010 | Chen et al. |

OTHER PUBLICATIONS

Notice of Allowance in U.S. Appl. No. 12/372,240.
Anan, A. et al., "J. Molecular Catalysis A, vol. 288 (1,2)", *Selective, efficient nanoporous catalysts for nitroaldol condensation: Co-placement of multiple site-isolated functional groups on mesoporous materials*. 2008, pp. 1-13.
Bezemer, G. L. et al., "J. Catalysis, vol. 237 (2)", *Preparation of Fischer-Tropsch cobalt catalysts supported on carbon nanofibers and silica using homogeneous deposition-precipitation*. 2006, pp. 291-302.
Brugger, R. et al., "J. Chromatogr. A, vol. 593 (1,2)", *Investigations of the influence of silanol groups on the separation of enantiomers by liquid and supercritical fluid chromatography* 1992, pp. 309-316.
Cheng, W. et al., "Material Letters, vol. 60 (15)", *A novel way to synthesize high regular and periodic organic mesoporous silicas*. 2006, pp. 1843-1846.
Cunliffe, et al., "J. Sep. Sci., vol. 30", *Fused-core particle technology as an alternative to sub-2-um particles to achieve high separation efficiency with low backpressure*. 2007, pp. 3104-3109.
DeStefano, J. et al., "J. of Chromatogr. Sci., vol. 46", *Characteristics of superficially-porous silica particles for fast HPLC: Some performance comparisons with sub-2-um particles*. 2008, pp. 254-260.
Gasparrini, F. et al., "J. Chromatogr. A, vol. 1176 (1,2)", *Synthesis and characterization of novel internal surface reversed-phase silica supports for high-performance liquid chromatography* 2007, pp. 79-88.
Gritti, et al., "Chromatogr. A, vol. 1157", *Comparison between the efficiencies of columns packed with fully and partially porous C18-bonded silica materials*. 2007, pp. 289-303.
Gritti, et al., "J. Chromatogr. A, vol. 1166", *Comparative study of the performance of columns packed with several new fine silica particles*. 2007, pp. 30-46.
Kirkland, J., "Anal. Chem., vol. 41", *Controlled surface porosity supports for high speed gas and liquid chromatography*. 1969, pp. 218-220.
Kirkland, J., "Anal. Chem., vol. 64", *Superficially porous silica microspheres for the fast high-performance liquid chromatography of macromolecules* 1992, pp. 1239-1245.
Kirkland, J. et al., "J. Chromatogr. A, vol. 1126", *The art and science of forming packed analytical high-performance liquid chromatography columns* 2006, pp. 50-57.
Kirkland, J. J. et al., "J. Chromatogr. A, vol. 890", *Superficially porous silica microspheres for fast high-performance liquid chromatography of macromolecules*. 2000, pp. 3-13.
Kirkland, J. et al., "J. Chromatogr. A, vol. 965", *Atypical silica-based column packings for high-performance liquid chromatography*. 2002, pp. 25-34.
Kirkland, J. et al., "J. of Chromatogr. Sci., vol. 7", *High-speed liquid chromatography with controlled surface porosity supports* 1969, 7 pgs.
Kohler, J., "J. Chromatogr., vol. 385", *Improved silica-based column packings for high-performance liquid chromatorgraphy*. 1987, pp. 125-150.
Miyabe, , "J. Chromatogr. A, vol. 1183", *Evaluation of chromatographic performance of various packing materials having different structural characteristics as stationary phase for fast high performance liquid chromatography by new moment equations*. 2008, pp. 49-64.
Nakamura, H. et al., "Ceramics International, vol. 18 (3)", *Effect of crystallization of alumina hydrate in preparation of alumina-coated composite particles*. 1992, pp. 201-206.
Olkhovyk, O. et al., "Ind. Eng. Chern. Research, vol. 46 (6)", *Polymer-templated mesoporous organosilicas with two types of multifunctional organic groups* 2007, pp. 1745-1751.
Silva, C. R. et al., "al.,J. Chrornatogr. A. vol. 913 (1-2)", *Development of new urea-functionalized silica stationary phases characterization and chromatographic performance* 2001, pp. 65-73.
Stober, et al., "J. Colloid and Interface Sci. vol. 26", *Controlled growth of monodisperse silica spheres in the micron size range* 1968, pp. 62-69.
Sun, G. et al., "Intern. J. Pharrn., vol. 242 (1-2)", *Mechanical strength of microcapsules made of different wall materials*. 2002, pp. 307-311.
Watson, H. et al., "J. Adhesion Sci. and Tech., vol. 16 (4)", *Ureidosilanes on E-glass fibres: Deposition and surface characteristics*. 2002, pp. 429-448.
Kirkland J J et al: "Superficially porous silica microspheres for fast high-performance liquid chromatography of macromolecules", Journal of Chromatography, Elsevier Science Publishers B.V, NL, vol. 890, No. 1, Aug. 18, 2000, pp. 3-13, XP00422890, ISSNL 0021-9673, DOIL 10.1016/S0021-9673(00)00392-7.
J.J. Kirland; T.J. Langlois; J.J. DeStefano: "Fused Core Particles for HPLC Columns", American Laboratory, vol. 39, No. 8, Apr. 2007, pp. 18-21, XP002665205.
Search Report issued Dec. 12, 2011, by the European Patent Office with regard to related Application No. 10151960.1 (9 pages).

SUPERFICIALLY POROUS PARTICLES AND METHODS OF MAKING AND USING SAME

CROSS-REFERENCE TO RELATED APPLICATIONS

This application is a divisional of U.S. application Ser. No. 12/372,240, filed Feb. 17, 2009, now U.S. Pat. No. 7,846,337 which is incorporated herein in its entirety.

FIELD OF INVENTION

The present invention relates to porous-shell particles, methods of making the particles, and uses thereof. In one aspect, the porous-shell particles are superficially porous particles.

BACKGROUND

A porous-shell particle typically comprises a metal oxide core particle surrounded by a porous shell around the core particle. Porous-shell particles are typically either "totally porous," having a porous core and a porous shell, or "superficially porous," having a substantially solid core and a porous shell. Porous-shell particles are used in a variety of applications, including for example, catalysis and chromatography. For most applications, micron scale porous particles are used, typically having diameters less than 500 μm.

A number of methods exist for making porous-shell particles. One method involves a spray-drying technology, which is described in U.S. Pat. No. 4,477,492 to Kirkland. In the spray-drying method, silica cores are mixed with colloidal silica sol, and the resultant mixture is spray-dried under high pressure at an elevated temperature (typically around 200° C.). While this method has its advantages, particles made by spray-drying are often incompletely or inhomogeneously coated and are often contaminated by undesired particles formed without the silica core, which can be difficult to separate from the desired particles.

Another method for making porous-shell particles involves multilayer technology, wherein metal oxide core particles are repeatedly coated with alternating layers of colloidal particles through electrostatic deposition. Methods using this approach are described in U.S. Pat. No. 3,505,785 and U.S. Patent Application No. 2007/0189944, both to Kirkland. The multilayer layer method, however, can be time-consuming, often requiring multiple deposition steps. In addition, the multilayer method is typically not optimal for particles having diameters less than 5 μm.

Another approach is the coacervation method, wherein metal oxide core particles are coated with a coacervation layer comprised of an organic material (typically a polymer) and colloidal metal oxide particles. The organic material is then removed, leaving behind metal oxide core particles having a porous shell comprising the colloidal particles. The coacervation method is more amenable to large-scale production relative to other methods, but is still not optimal. Typically, difficulties arise in forming the coacervation layer. In many instances, the coacervation layer does not properly coat the metal oxide core, which undesirably results in the formation of totally porous particles comprising the colloidal metal oxide particles together with bare metal oxide core particles.

Accordingly, there is a need for improved methods for making porous-shell particles, and in particular methods which can provide improved particle and pore size distribution, as well as smaller porous-shell particles. These needs and other needs are satisfied by the present invention.

SUMMARY OF INVENTION

In accordance with the purpose(s) of the invention, as embodied and broadly described herein, the invention, in one aspect, relates to improved methods for making porous-shell particles, particles produced by the methods, and uses of the particles.

In one aspect of the present invention, superficially porous particles are made by attaching an organic surface modifier to a solid metal oxide core particle to provide a surface modified solid metal oxide core particle. A coating can then be formed on the surface modified solid metal oxide core particle, wherein the coating comprises a continuous polymeric phase bonded to the organic surface modifier and a particulate phase dispersed within the continuous polymeric phase. The continuous polymeric phase can then be removed from the coating to provide a superficially porous particle.

Also disclosed are a plurality of superficially porous particles, wherein at least one of the superficially porous particles is aggregated with a smaller totally porous particle.

Also disclosed are separation devices having a stationary phase comprising a plurality of superficially porous particles, wherein at least one of the superficially porous particles is aggregated with a smaller totally porous particle.

The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION OF THE INVENTION

Figure 1:
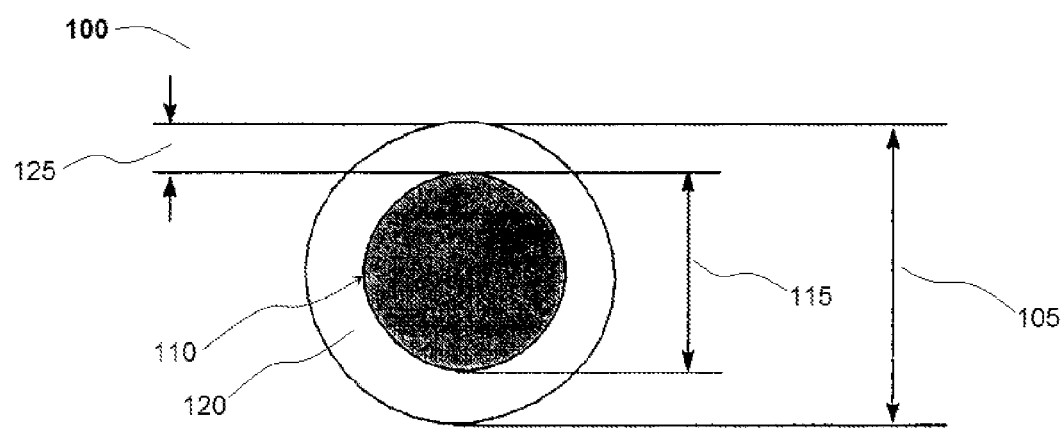
FIG. 1 is a diagram of a disclosed superficially porous particle.

Before the present compounds, compositions, particles, devices, articles, methods, or uses are disclosed and described, it is to be understood that the aspects described below are not limited to specific compounds, compositions, particles, devices, articles, methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

Throughout this specification, unless the context requires otherwise, the word "comprise," or variations such as "comprises" or "comprising," will be understood to imply the inclusion of a stated component or step or group of components or steps but not the exclusion of any other component or step or group of components or steps.

It must be noted that, as used in the specification and the appended claims, the singular forms "a," "an" and "the" include plural referents unless the context clearly dictates otherwise. Thus, for example, reference to "a particle" includes mixtures of two or more such particles.

"Optional" or "optionally" means that the subsequently described event or circumstance can or cannot occur, and that the description includes instances where the event or circumstance occurs and instances where it does not.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of a component in a composition or mixture, unless specifically stated to the contrary, is based on the total weight of the composition of mixture in which the component is included.

As used herein, "median particle size" refers to the median or the 50% quantile of total particle size distribution.

As used herein, "coacervation" refers to a process by which a porous shell comprising a particulate phase is formed around a core particle. The coacervation process comprises forming a coating also referred to as a "coacervation layer" around the core particle. The "coacervation layer" comprises a continuous polymeric phase and a dispersed particulate phase. The "coacervate," in one aspect, is the polymer of the continuous polymer phase. The particulate phase typically comprises particles that are smaller than the core particle. After formation of the coacervation layer, the continuous polymeric phase can be removed to provide a porous shell comprising the remaining particulate phase formed around a core particle. The term "coacervation" refers to a process defined herein, and is not restricted to any particular composition or chemical reaction. Likewise, the terms "coacervation layer," and "coacervate" refer to compositions that are not restrictive to any particular method for making the coacervation layer or coacervate.

Disclosed are compounds, compositions, and particles that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a number of different polymers and core particles are disclosed and discussed, each and every combination and permutation of the polymer and core particles are specifically contemplated unless specifically indicated to the contrary. Thus, if a class of polymers A, B, and C are disclosed as well as a class of core particles D, E, and F and an example of a combination particle coated with the polymer, A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B; and C, D, E, and F; and the example combination A-D Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed particles. Thus, if there are a variety of additional steps that can be performed it is understood that each of these additional steps can be performed with any specific embodiment or combination of embodiments of the disclosed methods, and that each combination is specifically contemplated and should be considered disclosed.

In one aspect, the present invention relates to an improved coacervation method for making porous-shell particles, including superficially porous particles. It was discovered that, prior to forming a coacervate layer on the surface of a core particle, the core particle can be advantageously modified with a material that enhances the formation of the coacervate coating. The disclosed methods offer a number of advantages, including providing for superficially porous particles having smaller particle sizes (e.g., from about 0.5 to about 10 μm) and smaller size distributions than conventional methods known in the art. The methods also provide for particles exhibiting improved performance in separation devices.

Generally, the core particle can be a porous or non-porous particle. In one aspect, the core particle is a non-porous, solid particle. As used herein, a "solid particle" is one that is not a liquid or a gas. Solid particles can be pervious or impervious. For certain chromatographic applications, it can be preferable to use impervious solid particles (i.e., particles having a low pore volume), such that materials passing through a zone of such particles do not enter the interior of the core. Typically, pore volumes for impervious cores are less than about 0.005 $cm^3/gm$.

The core particle can have any desired shape, which will generally depend on the targeted application. For chromatographic applications, suitable shapes include without limitation spheres, rings, polyhedra, saddles, platelets, fibers, hollow tubes, rods and cylinders, and mixtures of any two or more such shapes. In one aspect, the core is substantially spherical. Spherical cores can be easily packed and are thus desirable for certain applications, such as chromatography.

The composition of the core particle is not critical, provided that the core be capable of reacting or bonding to an affinity material which aids in the formation of the coacervate coating around the core particle. Suitable core materials include without limitation glasses, sands, metals, metalloids, ceramics, and combinations thereof.

It should be understood that the shape, composition, and size of the core particles can be distributional properties that vary. To that end, it is not required that all the core particles in a given population comprise a uniform size, composition, or shape. It is therefore contemplated that according to aspects of the invention, all or substantially all core particles have the same or similar size, shape, and composition. Alternatively, it is also contemplated that according to other aspects of the invention, the shape, composition, and size of core particles in a given population can vary.

In one aspect, the core particle comprises a metal oxide, such as a refractory metal oxide. In a further aspect, the core particle is a solid metal oxide particle. Exemplary metal oxides include without limitation silica, alumina, titania, zirconia, ferric oxide, antimony oxide, zinc oxide, and tin oxide. In another aspect, the core particle can comprise silica, alumina, titania, zirconia, or a combination thereof. In a further aspect, the core particle comprises silica. In one aspect, the metal oxide particle with surface hydroxyl groups can be modified with a disclosed surface modifier.

The core particles can have any desired size, depending on the desired size of the porous-shell particle. Generally, the core particle is larger than the colloidal particles used to form the porous shell. In one aspect, the core particle has a size ranging from about 20% to about 99% of the total particle size.

In one aspect, the core particles have a median particle size from about 0.1 μm to about 100 μm, including without limitation core particles having a median particle size from about 0.5, 2, 4, 6, 8, 10, 12, 14, 16, 18, 20, 30, 40, 50, 60, 70, 80, and 90 μm. It will be apparent the disclosed methods are useful for smaller particles, e.g. porous-shell particles having median particle sizes less than about 10 μm, or less than about 5 μm. Such particles can be prepared from corresponding core particles having median particle sizes of from about 0.1 to about 10 μm, or from about 0.1 to about 5 μm, or from about 0.1 to about 3 μm. In specific aspects, a core particles (e.g. silica) have a median particle size of from about 1 to about 3 μm, including without limitation 1, 1.2, 1.5, 1.8, 1.9, 2, 2.2, 2.5, 2.7, and 3 μm.

Depending on the conditions used during coacervation, the median size of the core particle can change throughout the process. For example, after sintering, the core of the porous-shell particle can be smaller than the core used as the starting material. To that end, in one aspect, those median sizes disclosed above refer to core sizes prior to processing. In another aspect, the size of the core remains substantially similar after processing, and those sizes disclosed above also refer to the size of the core in the final porous-shell particle. In a further aspect, those sizes disclosed above refer to the size of the core in the final porous-shell product, regardless of the size of the starting material core. Particle size can be determined using methods known in the art, for example through the use of a Coulter Counter, which can also count particles and thus provide particle size distributions.

The particle size distribution of the core particles can vary depending on the composition of the core particle and the method in which the core particle was made and/or processed. In one aspect, the core particles have a particle size distribution of less than about 20% of the median particle size, including for example, less than about 15%, less than about 10%, or less than about 5% of the median particle size. In a further aspect, the core particles have a particle size distribution of from about 0.5% to about 10% of the median particle size, including without limitation particle size distributions of from about 0.5% to about 8%, 0.5% to about 6%, and from about 0.5% to about 5% of the median particle size.

Solid metal oxide core particles can be made by various known processes, including processes disclosed in U.S. Pat. No. 3,634,588 to Steitz et al., U.S. Pat. No. 4,775,520 to Unger et al., and U.S. Pat. No. 4,983,369 to Barder et al., each of which is incorporated herein by this reference for its teaching of methods for making metal oxide particles. Metal oxide core particles can also be provided by sintering porous particles (e.g., commercially available porous particles) to form solid particles. When certain metal oxide particles are used, such as silica, commercially available glass beads (Potters Industries, Inc., Valley Forge, Pa., U.S.A.), can be elutriated and fractionated into desired size distributions. Such commercial products are not typically purified, but can be surface-purified by treatment with acid, such as hydrochloric acid or nitric acid, to remove contaminating materials, if present.

In a specific aspect, when silica particles are used, the process disclosed in U.S. Pat. No. 4,775,520 to Unger et al., referenced above, is used to provide the core silica particles. In accordance with this method, small silica "seed" nanoparticles obtained from high purity silica sol are prepared by a method such as described by Stober et al., J. Colloid Interface Sci. 26 (1968) 62-69, which is incorporated herein by this reference for its teaching of the preparation of silica seed particles. The silica seed particles are then grown into cores of a desired size by depositing silica produced by the slow hydrolysis of tetraethyl-o-silicate by dilute ammonia while the seed particles are suspended in solution. The core particles produced by this method can contain micropores, and thus can be solidified by a method such as autoclaving or sintering, discussed above.

Depending on the processing method, it can be useful to further modify a core particle produced by one of the methods disclosed above prior to coating or reacting the core particle with another material, or prior to adding the organic surface modifier used as an aid during the coacervation step, discussed below. For example, if sintering is used in the making or processing of the particle, it can be desirable to rehydroxylate the surface of the core particle prior to reacting the particle further. Rehydroxylation can be carried out by a number of methods, including by placing the core particles in boiling and/or strong hydrochloric or nitric acid, or by the procedures described in J. Kohler and J. J. Kirkland, J. Chromatogr. 385 (1987) 125, which is incorporated herein by this reference for its teaching of surface rehydroxylation.

Prior to forming the coacervate layer around the core particle, it can be useful to first attach an organic surface modifier to the core particle, as briefly discussed above. When the coacervation layer comprises a continuous polymer phase having a dispersed particulate phase therein, the organic surface modifier can, in various aspects, enhance the binding of the continuous polymer phase to the core particle. In certain aspects, the organic surface modifier can bond to the coacervate layer and/or the continuous polymer phase. In further aspects, the organic surface modifier can covalently bond to the continuous polymer phase. For example, the organic surface modifier can be a residue from which a polymerization can begin and/or a residue to which an oligomer or polymer can covalently bond. Thus, in various aspects, the organic surface modifier functions to aid in the formation of the coacervation layer around the core particle by attracting the continuous polymer phase or precursor(s) thereof to the surface of the core particle. By doing so, the particulate phase of the coacervation layer, which is or becomes dispersed in the continuous polymer phase, is also thereby attracted to the surface, allowing a well-defined porous shell to from around the core, once the continuous polymer phase is removed.

The composition of the organic surface modifier is not critical, provided that it provides the desired result. Generally, however, the organic surface modifier is chemically similar (or can bond or react) to the polymer or precursor(s) thereof used to form the coacervation layer. In one aspect, the organic surface modifier has the same or a similar functional group as the polymer in the coacervation layer.

In certain aspects, when the continuous polymer phase comprises poly(urea-formaldehyde) and/or poly(melamine), the organic surface modifier comprises a functional group that can react with a precursor urea, formaldehyde, or melamine monomer; or oligomer or polymer thereof. In the specific case of poly(urea-formaldehyde) or poly(melamine), suitable functional groups include electrophilic or nucleophilic groups that can react with urea, formaldehyde, melamine, or an oligomer or polymer thereof. Exemplary functional groups that can react with formaldehyde include without limitation alcohols, thiols, amines, amides, among others. A specific example is a ureido residue. Suitable functional groups that can react with urea and/or melamine include ketones, aldehydes, isocyanates, acryl groups, epoxy groups, glycidoxy groups, among others.

In one aspect, the organic surface modifier is covalently bonded to the surface of the core particle. In a further aspect, the organic surface modifier is covalently bonded to one or more surface oxygen atoms (i.e., formerly hydroxyl groups, prior to attaching the organic surface modifier) of the core metal oxide particle. In a still further aspect, the organic surface modifier is covalently bonded to the surface of the core particle through one or more M-O- bonds, wherein M is Si, Al, Ti, Zr, Fe, Sb, Zn, or Sn.

In specific aspects, the organic surface modifier can comprise an organosilane residue that is bonded to the surface of a metal oxide particle (e.g. a silica particle). A variety of organosilane residues can be used, provided they are capable of bonding to the continuous polymer phase of the coacervation layer. In one aspect, the organosilane comprises one or more of those functional groups discussed above. In a further aspect, the organosilane is (aminopropyl)triethoxysilane, (3-trimethoxysilylpropyl)diethylenetriamine, (3-glycidoxypropyl)trimethoxysilane, (isocyanatopropyl)triethoxysilane, (isocyanatopropyl)triethoxysilane, (isocyanatopropyl)triethoxysilane, or (isocyanatopropyl)triethoxysilane. In a further aspect, the organosilane is not (aminopropyl)triethoxysilane, (3-trimethoxysilylpropyl)diethylenetriamine, (3-glycidoxypropyl)trimethoxysilane, (isocyanatopropyl)triethoxysilane, (isocyanatopropyl)triethoxysilane, (isocyanatopropyl)triethoxysilane, or (isocyanatopropyl)triethoxysilane.

In further aspects, when the continuous polymer phase comprises poly(urea-formaldehyde), the organosilane used to form the organic surface modifier can comprise one or more of (aminopropyl)triethoxysilane, (3-trimethoxysilylpropyl)diethylenetriamine, (3-glycidoxypropyl)trimethoxysilane, or ureidopropyltrimethoxysilane.

In a further aspect, the organic surface modifier is itself an oligomer or polymer, which can be the same or different than the polymer used in the coacervation layer. The oligomer or polymer can be physisorbed and/or bonded to the surface of the core particle. Thus, the oligomer or polymer can be covalently or non-covalently (e.g., electrostatically, hydrophilically/hydrophobically, hydrogen bonded, coordinated, etc.) bonded to the surface of the core particle, or can be merely physisorbed where no chemical bond exists. An example of a polymer that can be covalently bonded to a surface of a core particle is poly(l-vinylpyrrolidone-co-2-dimethylaminoethyl methacrylate).

In one aspect, the organic surface modifier is noncovalently bonded (e.g., hydrogen bonded, coordinated, etc.) and/or physisorbed to the surface of the core particle. For example, if the continuous polymer phase of the coacervation layer comprises poly(urea-formaldehyde), the organic surface modifier can be poly(urea-formaldehyde). In this aspect, it can be preferable that the poly(urea-formaldehyde) used as the organic surface modifier is oligomeric, or at least smaller than the polymer used in the coacervation layer. In this exemplary aspect, the organic surface modifier becomes a part of the continuous polymer phase. In other aspects, polymers such as polyethylenimine, polyacrylamide, or poly(melamine) can be noncovalently bonded or physisorbed to the surface of the core particle.

In one aspect, the method for making the superficially porous particles first comprises providing a solid metal oxide core particle having an organic surface modifier attached to a surface thereof. This step can be accomplished, in various aspects, by attaching an organic surface modifier to the solid metal oxide core particle to provide a surface modified solid metal oxide core particle, as discussed above. The surface modifier can be attached to the core particle through various means. When the modifier is covalently bonded to the surface of the core particle, a reactive residue, polymer, oligomer, or polymer can be reacted with one or more surface hydroxyl groups, or another functional group on the surface, under conditions effective to form a covalent bond. Various methods for modifying the surface of metal oxide particles are known in the art.

When the modifier is a polymer, for example, the core particle can be placed in a solution of one or more monomers, and the one or more monomers can be polymerized, thereby adhering the polymer or oligomer to the surface of the core, through a chemical bond, physisorption, or both. In a specific aspect, a core particle can be placed in a solution of urea and formaldehyde, and the pH of the solution can be adjusted to from about 3.5 to about 5.5, to thereby produce a desired oligomer or polymer of urea and formaldehyde, which can chemically react with a functional group attached to the surface and/or physisorb to the surface of the core particle during or after polymerization. Prior to dropping the pH to from about 3.5 to about 5.5, the pH of the solution should typically be basic, e.g. from about pH 10-11, to prevent undesired polymerization. Following the formation of the oligo- or poly (urea-formaldehyde), the pH of the solution can be raised, for example to about pH 9, to aid in breaking up excess poly (urea-formaldehyde) that is formed. In this aspect, if the pH is too low (e.g., less than 3) during the formation of the oligo- or poly(urea-formaldehyde) surface modifier, cross-linking of the oligo- or poly(urea-formaldehyde) can be too extensive, resulting in the formation of undesired aggregates. Likewise, if the pH is too high (e.g., greater than 6), cross-linking can be too minimal, and a coating may not form on the core particle. It is understood that the above disclosed process for preparing a core particle modified with an oligo- or poly(urea-formaldehyde) is suitable for instances wherein the oligo- or poly (urea-formaldehyde) is chemically bonded and/or physisorbed to the core particle.

Once the surface modified core particle is provided, the coacervation coating can be formed or applied to the particle. Generally, the coacervation coating comprises a continuous polymeric phase bonded to the organic surface modifier and a particulate phase dispersed within the continuous polymeric phase. As discussed above, the coacervation coating or a portion thereof adheres or bonds to the organic surface modifier to enhance the formation of the porous shell around the core particle.

The polymeric phase can comprise any suitable polymer which can comprise a dispersed particulate phase and which can covalently, noncovalently, or physically bond to the organic surface modifier. In one aspect, a suitable polymer is cross-linkable polymer. It will be apparent that the cross-linking ability of the polymer can aid in the dispersion of the particulate phase within the polymer. In one aspect, the continuous polymer phase comprises a poly(urea-formaldehyde), poly(melamine), or a combination, or copolymer thereof.

The particulate phase generally comprises metal oxide particles, which are typically smaller in size than the core particle. The composition of the particulate phase can comprise any of those metal oxides described above. In one aspect, the particulate phase comprises a refractory metal oxide particle. Exemplary metal oxides include without limitation silica, alumina, titania, zirconia, ferric oxide, antimony oxide, zinc oxide, and tin oxide. In another aspect, the particulate phase can comprise silica, alumina, titania, zirconia, or a combination thereof. In a further aspect, the particulate phase comprises silica.

The particles of the particulate phase can have any desired size. Preferably, the particulate phase particles are smaller in size than the core particle, such as, for example, about 10%, 25%, 50%, or 75% smaller than the core particle, or smaller. In one aspect, the particles of the particulate phase are nanoscale sized particles. For example, the particles can have a size or average diameter from about 1 nm to about 1000 nm, including without limitation particles having an average diameter from about 1 nm to about 100 nm, from about 1 nm to about 50 nm, from about 1 nm to about 30 nm, from about 1 nm to about 15 nm, or from about 1 nm to about 10 nm. The particles of the particulate phase can have any suitable particle size distribution, including for example 50%, 30%, 20%, 10%, 5%, or less of the median particle size. In one aspect, the particulate phase comprises silica, and is formed from silica sol, or colloidal silica.

The coacervate composition can be provided using various methods. In one aspect, the coacervate composition is formed and coated onto the modified core particle in one pot. In a further aspect, the coacervate layer can be formed by placing the core particles in a solution or dispersion of one or more monomers used to form the continuous polymer phase and particles used to form the particulate phase. The monomers can be polymerized into oligomers or polymers, which will comprise dispersed therein the particulate phase, and which can bind to the modified core. In a specific aspect, the core particle can be placed into a solution or dispersion of particles, such as silica sol. The solution or dispersion can then be agitated, to thereby reduce agglomeration of the particles. Then, the monomer(s) can be added into the solution or dispersion, followed by the polymerization of the monomers.

In a further specific aspect, when the continuous polymer phase comprises poly(urea-formaldehyde), the modified core particle can be added to a solution or dispersion of silica sol, followed by optional agitation, and then urea and formaldehyde can be added to the solution, followed by the polymerization of the urea and formaldehyde under a pH effective to form the desired continuous polymer phase (e.g., lower than 2, and preferably 1.5).

Once the coacervate coating is formed, the continuous polymeric phase and/or the organic surface modifier can be removed from the coating to provide a porous-shell particle. Generally, the polymeric phase is removed by heating the particles at a temperature sufficient to burn off the polymeric phase, for example from about 500° C. to about 800° C. for a sufficient time (e.g., about 2 to 3 hours). If desired, the formed porous-shell particles can be sintered to solidify and strengthen the particles and/or reduce undesired micropores in the porous shell (i.e. the particulate phase). Sintering can be accomplished, for example, at a temperature of from about 900° C. to about 1500° C., including for example, 1000° C. If desired, the surface of the particles can be rehydroxylated, using methods discussed above. Additionally, the particles can be size-classified by liquid elutriation.

The disclosed porous-shell particles can be made by the disclosed methods, or other methods. The porous-shell particles can have any shape or composition discussed above. For example, with reference to FIG. 1, a spherical porous-shell particle 100 generally comprises a particle diameter 105, a solid core 110 having a solid core diameter 115, which is surrounded by a porous shell 120 having a corresponding shell thickness 125.

In one aspect, the solid core has a size ranging from about 20% to about 99% of the total particle size, including without limitation 30%, 40%, 50%, 60%, 70%, 80%, or 90% of the total particle size. The porous outer shell typically comprises particles from the particulate phase, discussed above. The shell can have any desired porosity. In one aspect, the particles have shells having substantially ordered pores with median pore sizes from about 15 to about 1000 Å, including for example about 20, 50, 100, 200, 500, 700, 800, or 900 Å median pore sizes. In a specific aspect, the core particles comprise shells having substantially ordered pores with a median pore size from about 100 to about 200 Å, including for example, about 120 Å median pore size. Likewise, the pores can have any corresponding pore volume, including pore volumes of from about 0.1 to about 10 $cm^3/g$, such as from about 0.1 to about 0.5 $cm^3/g$.

The porous-shell particles generally have a surface area of from about 5 to about 1000 $m^2/g$. For example, the porous-shell particles can have a surface area of from about 5 to about 200 $m^2/g$, including without limitation about 120 $m^2/g$.

The porous-shell particles can have any desired size, depending on the size of the core particle and the shell thickness. In one aspect, the particles have a median particle diameter from about 0.1 to about 100 μm, including for example, particles having a median diameter from about 0.1 to about 50 μm, 0.1 to about 30 μm, 0.1 to about 20 μm, 0.1 to about 10 μm, or 0.5 to 10 μm. In one aspect, the disclosed methods are useful for small particles, e.g. those having a median particle diameter of from about 0.1 to about 5 μm, including for example, particles having a median particle diameter of about 3 μm.

In one aspect, superficially porous particles are present as a plurality of particles, wherein at least one of the superficially porous particles is aggregated with smaller totally porous particle. With reference to the micrograph of FIG. 2, for example, it can be seen that at least one of the superficially porous particles 210 comprising a solid silica core and a porous silica shell is aggregated with a smaller totally porous particle 215. In one aspect, the plurality of particles is made by the disclosed methods.

It will be apparent that when using the disclosed coacervation methods, a small amount of dimers, trimers and aggregates of the particles can form. At least two types of dimers/trimers/aggregates can form during the disclosed coacervation methods. First, dimers/trimers/aggregates comprising two or more superficially porous particles can form. Typically, each particle in such dimers/trimers/aggregates are similar in size, thus allowing these dimers/trimers/aggregates to be removed by processes such as elutriation from the desired particles. Second, the inventive coacervation methods also produce another type of dimer/trimer/aggregate that comprises one or more superficially porous particles aggregated with one or more smaller totally porous particles. This type of dimer/trimer/aggregate can often not be removed from the desired particles, due to their size similarities. Generally, the totally porous particle of such a dimer/trimer/aggregate comprises a particle used in the particulate phase, without the solid core, which tends to form at about the same rate as the porous shell. It should be appreciated, however, this type of dimer/trimer/aggregate does not typically produce any substantial deleterious effects when using the particles in applications, for example chromatography.

Figure 3:
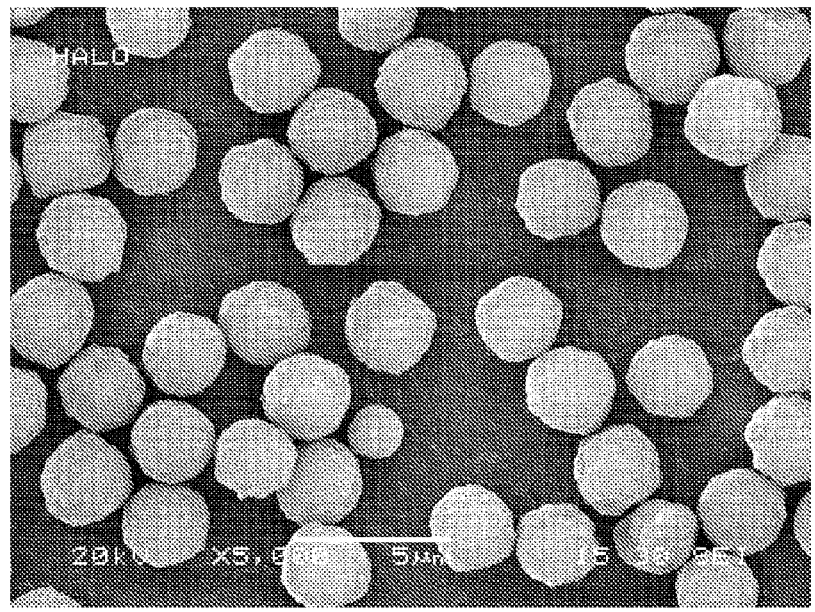
FIG. 3 is a micrograph of superficially porous particles prepared by the multilayer method.

By contrast, the multilayer method for producing superficially porous particle does not result in dimers/trimers/aggregates comprised of one or more superficially porous particles and one or more smaller totally porous particles. This can be seen, for example, in FIG. 3, which shows superficially porous silica particles made by the multilayer method. The multilayer method, however, can result in the first type of dimer/trimers/aggregates discussed above, which comprise two or more superficially porous particles aggregated together. As discussed above, such dimers/trimers/aggregates are typically easily removed from the desired particles by a process such as elutriation.

The porous-shell particles can be used in any desired application. In one aspect, the porous shell particles are used in a separation device. The separation device can, for example, comprise the plurality of particles discussed above. The separation device can also comprise a product of the disclosed methods. Examples of suitable separation devices include chromatographic columns, chips, solid phase extraction media, pipette tips and disks.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in degrees Centigrade (° C.) or is at ambient temperature, and pressure is at or near atmospheric. There are numerous variations and combinations of reaction conditions, e.g., component concentrations, component mixtures, desired solvents, solvent mixtures, temperatures, pressures and other reaction ranges and conditions that can be used to optimize the product purity and yield obtained from the described process. Only reasonable and routine experimentation will be required to optimize such process conditions. In the following examples, particle size was measured using Beckman Coulter Counter instruments.

Example 1

Preparation of Surface Modified Core Particles (I)

In a first example, core particles of 1.90-μm diameter were prepared by growing 600 nm silica sol "seed" particles. Specifically, 600 nm silica sol "seed" particles were prepared by 40 mL of EtOH, 50 mL of ammonium hydroxide, and 10 mL tetraethoxysilane (TEOS) at 40° C. according to Stober et al., J. Colloid and Interface Sci. 26, 62-69 (1968). A solution "A" containing 400 ml of TEOS and 1600 ml of ethanol, and a solution "B" containing 480 ml of $NH_4OH$, 720 ml of $H_2O$ and 800 ml of ethanol were added separately and continuously at a flow rate of 5 ml/min into the 600 nm silica sol "seed" particles in a flask maintained at 40° C. until the median particle size reached about 1.90 μm. Then, a solution of 25 ml of ureidopropyltrimethoxysilane (Gelest, catalog# SIU9058.0) in 25 ml of ethanol was added into the above solution at a flow rate of 5 ml/min. The mixture was stirred overnight at 40° C. The silica cores were centrifuged at 1300 rpm for 10 minutes, and reslurried in one liter of $H_2O$ and centrifuged at 1300 rpm for 10 minutes. The cores were washed several times by reslurrying in water followed by centrifugation. Finally the silica cores were in one liter water. A small sample was taken out, dried, and sent out for carbon analysis (Microanalysis, Wilmington, Del.). The cores exhibited 0.50% to 1.0% carbon. Another small sample was sintered at 1000° C. for 2 hours. The size after sintering was measured as 1.67 μm diameter by the Coulter Counter, and the surface area was measured as <1 $m^2/g$ by the Tristar instrument (Micromeritics, Norcross, Ga.).

To the above silica cores, were added 32 g of urea (Aldrich, catalog# U5128) and 54.8 g of formaldehyde (Aldrich, catalog# 252549). The pH was adjusted to 4.0 by nitric acid. After 4 hours, the pH was adjusted again to 4.0. The solution was stirred at room temperature overnight. The silica solution or dispersion was centrifuged at 1300 rpm for 10 minutes, and was reslurried in one liter of 2 nm sol solution and sonicated for 30 minutes. The cores were centrifuged at 1300 rpm for 10 minutes, reslurried in one liter of water, and centrifuged at 1300 rpm for 10 minutes. The above centrifugation and reslurry step was repeated 4 times until there was no polymer floating in the upper layer under microscope. Finally the silica cores were reslurried in one liter of acetone, filtered, allowed to dry in the air for several hours. The silica was then dried at 100° C. overnight. The final weight was ~100 g. A small sample was taken out, dried, and sent out for carbon analysis (Microanalysis, Wilmington, Del.). The cores exhibited 2.0% to 4.0% carbon.

Example 2

Preparation of Surface Modified Core Particles (II)

The 1.2 μm silica cores were prepared by the procedure in example 1 except the size was allowed to grow to 1.2 μm, and the core surface was also modified according to the procedure in example 1 with ureidopropyltrimethoxysilane and urea/formaldehyde. A small sample was sintered at 1000° C. for 2 hours. The size after sintering was measured as 1.05 μm diameter by the Coulter Counter, and surface area was measured as <1 m2/g by the Tristar instrument (Micromeritics, Norcross, Ga.).

Example 3

Preparation of Superficially Porous Particles (I)

Figure 2:
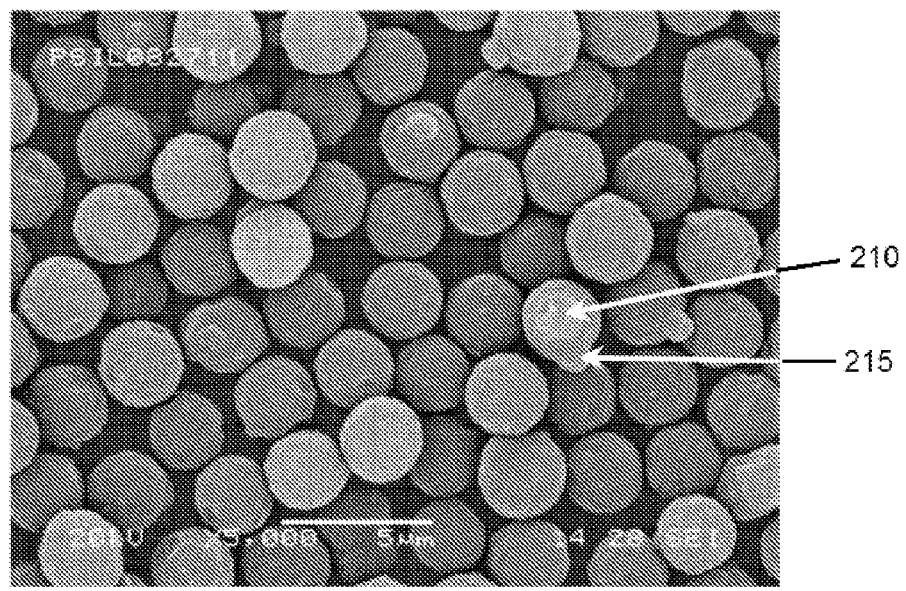
FIG. 2 is a micrograph of superficially porous particles prepared in Example 3.
Figure 4:
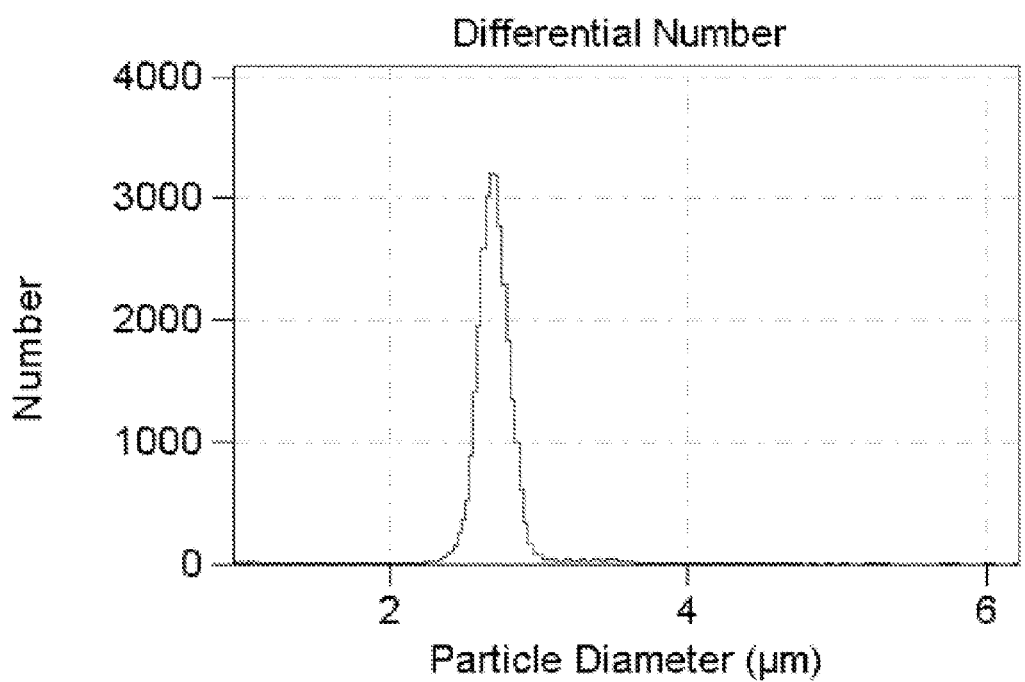
FIG. 4 is a graph of particle size distribution for the superficially porous particles prepared in Example 3.

Superficially porous particles were made by the coacervation method following standard coacervation methods disclosed in U.S. Pat. No. 4,010,242 to Iler et al., except solid cores were added in the coacervation mixture. Specifically, 66.36 g of the above cores made from Example 1 were added into 1900 g of 2 nm sol (4.84% $SiO_2$, 127.6 g $SiO_2$) in a beaker, and were sonicated for 10 to 15 minutes to make sure the cores broke apart into single particles (checked by microscope and Coulter). The mixtures of the cores and the sol solution were poured into a big container, followed by addition of 3617 g of water and 70 g of urea. The mixture was stirred until urea was dissolved. 92.4 g of 70% nitric acid was poured into the mixture under rapid stirring. After 30 seconds, 122.7 g of formaldehyde were poured into the mixture. The mixture was kept under rapid stirring for 30 seconds, and then was allowed to sit still overnight. The particles grew from 1.9 μm solid cores to 3.4 μm raw particles. A second population of fine particles in 1.1 to 1.3 μm size was also formed in the mixture. The supernatant was removed, and the particles were reslurried in water. The smaller particles were removed from the coated raw particles by either centrifugation several times or water elutriation fractionation. The coated raw particles were heated at 600° C. for 10 hours to burn off the urea/ formaldehyde polymer, and sintered at 1000° C. for 2 to 3 hours for strengthening. The surface of the sintered particles was then rehydroxylated by diluted hydrofluoric acid method described in J. Kohler and J. J. Kirkland, J. Chromatogr., 385 (1987) 125-150. After liquid elutriation fractionation to eliminate aggregated particles and fine particles, the particles demonstrated an average particle size of 2.68 μm±6% (one sigma) as measured by Coulter Counter (see FIG. 4). The nitrogen surface area of these particles was 136 m$^2$/g and average pore size of 126 Å as measured by the Tristar instrument (Micromeritics, Norcross, Ga.). Based on the diameter of the final particles (2.7 μm), it was calculated that the thickness of the porous shell coating on the solid cores was 0.5 μm. Scanning electron microscopy of these particles is shown in FIG. 2.

Example 4

Preparation of Superficially Porous Particles (II)

2.0 μm superficially porous silica particles with 1.0 μm solid cores and 0.5 μm thickness shell were prepared from the cores in Example 2 using the procedure in example 3. The particles were sintered at 1040° C. for 6 hours. The nitrogen surface area of the particles was 120 m$^2$/g, pore volume was 0.512 cm$^3$/g, and average pore size was 140 Å as measured by the Tristar instrument (Micromeritics, Norcross, Ga.).

Example 5

Preparation of Superficially Porous Particles (III)

Superficially porous silica particles were also prepared by gradual addition of urea and formaldehyde solution into the cores to gradually grow the shell to the desired thickness. 474 g of water, 58 g of ethanol, 46 g of 2 nm sol (5.7% SiO$_2$) and 5 g of surface modified cores in Example 1 were mixed as solution A, and sonicated for 20 minutes. Solution B comprised 289 g of water, 100 g of 2 nm sol, 8.4 g of urea and 12.6 g of formaldehyde solution mixed together until the urea dissolved. Solution A was set up with a polyethylene stir blade mixing at 200 rpm. 17.5 g of 70% nitric acid was added to solution A. Solution B was then gradually pumped into solution A with continuous stirring over ~40 minutes. After a total of 70 minutes from the beginning of solution B addition, the stir blade was removed and the particles were allowed to settle overnight. The particles grew to size in 3.3-3.6 μm with second population of fine particles in ~1.0 μm size. The supernatant was removed, and the particles were processed as in Example 3.

Example 6

Preparation of Superficially Porous Particles (IV)

2.7 μm superficially porous particles were prepared using 8 nm sol (4.64% SiO2) according to Example 3. The final particle surface area was 130 m2/g, pore volume was 0.40 cm3/g, and pore size was 120 Å.

Example 7

Preparation of a Separation Device Using the Superficially Porous Particles

A separation device was prepared and analysed using the superficially porous particles. Specifically, 2.7 μm superficially porous particles as prepared in Example 3 were bonded with n-octadecyldimethyl(dimethylamino)silane (Gelest, catalog# SIO6617.0) and endcapped with (n,n-dimethylamino)dimethylsilane (Gelest, catalog# SID3546.6) using standard bonding and endcapping procedures. A sample of the bonded and endcapped particles was loaded into a 4.6×50 mm column using the slurry packing method described in J. J. Kirkland and J. J. DeStefano, J. Chromatogr. A, 1126 (2006) 50-57. The final column was tested with a model 1200 HPLC system (Agilent Technologies) using 60% acetonitrile/40% water as the mobile phase at 24° C. At a flow rate of 2 ml/min, this column demonstrated 12,000 theoretical plates using naphthalene as the solute, representing a column performance with a reduced plate height of 1.5.

Figure 5:
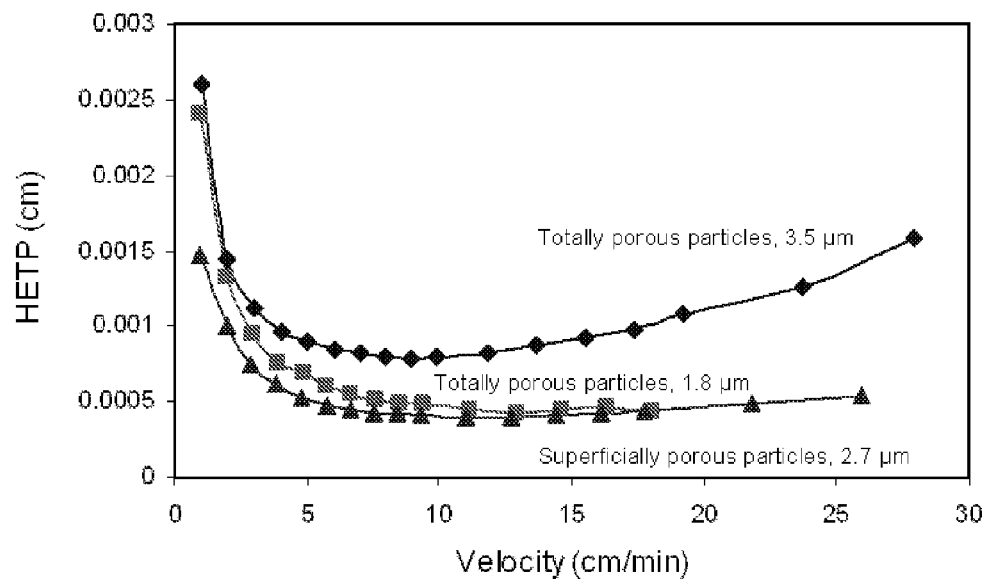
FIG. 5 is a plot of pressure vs. velocity for the columns prepared in Example 7
Figure 6:
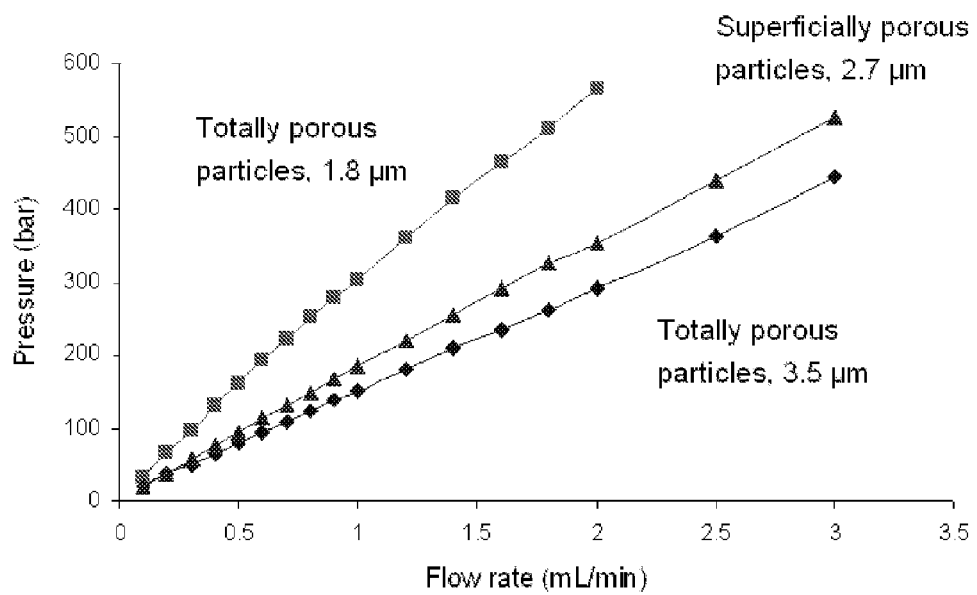
FIG. 6 is a plot of pressure vs. flow-rate for the columns prepared in Example 7.

The performance of the column of superficially porous particles was compared with those of totally porous silica particles in 1.8 μm and 3.5 μm diameters (both were Zorbax Eclipse Plus C18 from Agilent Technologies). All the columns were in 4.6×50 mm format. FIGS. 5 and 6 show van Deemter plots of for the columns. The data show that the inventive superficially porous particles exhibit plates superior to the 3.5 μm totally porous particles, and similar to 1.8 μm totally porous particles, while maintaining a much lower back pressure than that of the 1.8 μm totally porous particles.

What is claimed is:

1. A plurality of superficially porous particles; wherein at least one of the superficially porous particles is aggregated with a smaller totally porous particle.

2. The particles of claim 1, wherein the superficially porous particles comprise substantially solid cores having:
   a) a size ranging from about 20% to about 99% of the size of the total particle size;
   b) substantially porous outer shells having ordered pores with a median pore size ranges from about 15 to about 1000 Å with a pore size distribution (one standard deviation) of no more than 50% of the median pore size
   c) wherein the particles have a specific surface area of from about 5 to about 1000 m$^2$/g; and
   d) wherein the particles have a median size range from about 0.5 μm to about 100 μm with a particle size distribution (one standard deviation) of no more than 15% of the median particle size.

3. The particles of claim 1, wherein the superficially porous particles have a diameter from about 0.5 μm to about 10 μm.

4. The particles of claim 1, wherein the superficially porous particles comprise one or more of silica, alumina, titania, zirconia, ferric oxide, antimony oxide, zinc oxide, or tin oxide.

5. A separation device having a stationary phase comprising a plurality of superficially porous particles; wherein at least one of the superficially porous particles is aggregated with a smaller totally porous particle.

6. The separation device of claim 5, wherein the superficially porous particles comprise substantially solid cores having
   a) a size ranging from about 20% to about 99% of the size of the total particle size;
   b) substantially porous outer shells having ordered pores with a median pore size ranges from about 15 to about 1000 Å with a pore size distribution (one standard deviation) of no more than 50% of the median pore size
   c) wherein the particles have a specific surface area of from about 5 to about 1000 m$^2$/g; and
   d) wherein the particles have a median size range from about 0.5 μm to about 100 μm with a particle size distribution (one standard deviation) of no more than 15% of the median particle size.

7. The separation device of claim 5, wherein the superficially porous particles comprise one or more of silica, alumina, titania, zirconia, ferric oxide, antimony oxide, zinc oxide, or tin oxide.

* * * * *